United States Patent

[11] 3,583,828

[72] Inventor John C. White
 Torrance, Calif.
[21] Appl. No. 802,895
[22] Filed Feb. 27, 1969
[45] Patented June 8, 1971
[73] Assignee The Garrett Corporation
 Los Angeles, Calif.

[54] COMPENSATED GOVERNOR
 12 Claims, 3 Drawing Figs.
[52] U.S. Cl. .................................................. 416/38
[51] Int. Cl. ........................................... B64c 11/34,
 B64c 11/40
[50] Field of Search .......................................... 416/36.38;
 60/39.28

[56] References Cited
 UNITED STATES PATENTS

| | | | |
|---|---|---|---|
| 2,375,429 | 5/1945 | Martin .......................... | 416/36 |
| 2,391,323 | 12/1945 | Martin .......................... | 416/36 |
| 2,407,317 | 9/1946 | Mennesson .................... | 416/38 |
| 2,529,085 | 11/1950 | Kochenburger .............. | 416/38 |
| 2,645,293 | 7/1953 | Ogle ............................. | 416/36 |
| 3,073,329 | 1/1963 | Kast ............................. | 60/39.28 |
| 3,152,444 | 10/1964 | Peczkowski .................. | 60/39.28 |

Primary Examiner—Mark M. Newman
Attorneys—Herschel C. Omohundro and John N. Hazelwood ABSTRACT: This disclosure shows a compensating device for a flyweight governor. As usual the latter has a pilot valve and a spring normally urging it toward a position to admit fluid pressure to a propeller pitch varying means to decrease the engine load. The flyweights move the pilot valve against the spring force, as engine speed increases, to reduce the fluid pressure and cause the propeller pitch to change to increase the load on the engine. This action will decrease engine speed. The propeller thus assists in governing the rate of engine operation. According to the invention the operation of the governor is stabilized by providing it with compensating means, having a chamber divided into two sections by a movable wall. The wall has a resilient connection with the pilot valve and is normally balanced by equal fluid pressures on both sides. It has one side exposed to compressor pressure produced by the engine and when this pressure increases the wall moves to decrease the spring load applied to the pilot valve. This action permits the pilot valve to start to reduce the application of fluid pressure to the propeller pitch varying mechanism even before the flyweights can respond normally to increasing engine speed. The movable wall has a bleed orifice to permit pressure equalization and a restoration of the normal setting of the pilot valve spring shortly after this operation. When compressor pressure decreases the compensating means functions in the opposite manner. It should be noted that the compensating means moves the pilot valve in the same direction as the flyweights.

PATENTED JUN 8 1971

3,583,828

- MAXIMUM PITCH FEATHERED POSITION
- FLUID PRESSURE MOVEMENT
- SPRING ACTUATION
- REVERSE

INVENTOR.
JOHN C. WHITE

BY
Herschel C. Omohundro
ATTORNEY 3,583,828

COMPENSATED GOVERNOR

SUMMARY

This invention relates generally to the operation of prime movers of the type utilized to drive work-performing devices, such as propellers, especially aircraft propellers, which apply variable loads to the prime movers. More particularly, the invention relates to control means for governing the adjustment of a load-applying device by hydraulic means during a phase of operation in which the prime mover speed depends in part upon the setting of the load-applying device. While the invention is not limited to propeller drives, such adaptation has been selected for illustration. In a propeller drive, the prime mover speed frequently depends upon the pitch of the propeller blades. This phase is known in the art as the "propeller-governing mode." Means provided heretofore for this purpose have not been entirely satisfactory due to inherent instability or limit cycling with excess amplitudes. Attempts have been made to solve the problems by incorporating in the system a dynamic compensator which derives its stabilizing effect from the action of a buffer piston in the hydraulic servo circuit of the governor. These attempts have drawbacks since the system is sensitive to changes in oil viscosity, the mechanism is relatively complex, and the system is not automatically adaptable to the engine operating conditions. Also, transient performance must often be compromised in order to achieve the required degree of stability.

An object of this invention is to provide a control mechanism which will avoid the above objections by stabilizing the operation of the prime mover, particularly when it is of the gas turbine type.

Another object of the invention is to provide a hydraulic propeller adjusting system with pneumatic means for making adjustments in anticipation of governor actuations to prevent or minimize over- and under-control and thus stabilize turbine operation.

Still another object of the invention is to provide the governor of a hydraulic propeller pitch adjusting system with means for trimming governor operation in response to changes in a fluid pressure produced by the prime mover which drives the propeller.

A further object of the invention is to provide means in association with the governor of a hydraulic propeller pitch adjusting system, for temporarily changing the speed setting of the governor to secure a quicker response thereof to requirement for propeller adjustment, such means having a normally balanced wall responsive to a fluid pressure produced by the propeller driving engine to vary a force applied to a part of the governor.

A still further object is to provide a compensated propeller governor mechanism for a hydraulic pitch adjusting system having a pilot valve, a means for resiliently urging such valve toward one position, a speed responsive means for moving the pilot valve away from such position in opposition to the force of such resilient urging means, and a fluid pressure actuated means for varying the effective force of the resilient urging means in response to change in one or more of the parameters of operation of the propeller driving engine.

An object also is to so construct the mechanism mentioned in the preceding paragraph that the governor will be returned to its original setting following the passage of a predetermined time interval after a compensating operation is initiated.

Other objects and advantages will be made apparent by the following description of one modification of the invention which has been illustrated in the accompanying drawings.

IN THE DRAWINGS

DESCRIPTION

Figure 1:
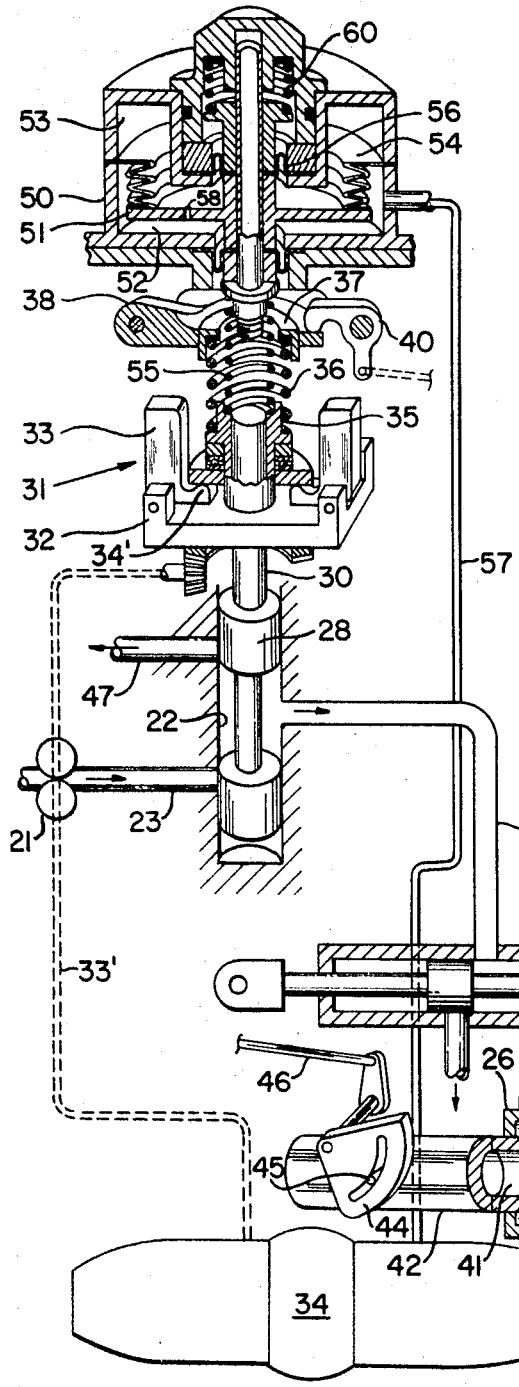
FIG. 1 is a sectional schematic view of a hydraulic propeller governor system provided with compensating means formed in accordance with the present invention.

More particular reference to the drawing will show that the compensated propeller governor mechanism selected to illustrate the present invention includes the combination of a substantially conventional hydraulic propeller pitch governing mechanism and a pneumatic compensator therefor. While the pitch governing mechanism per se is substantially conventional, a description of one form and its operation will be given here to facilitate the understanding of the present invention. The governing mechanism assists in the control of a hydraulically actuated variable pitch propeller. As shown in FIG. 1, the propeller includes a hub 10 from which the propeller blades 11 project in a radial direction and are supported for rotary adjustment. The hub includes a casing 12 in which a piston cylinder 13 is formed for the reception of a piston 14 having a rod 15 projecting axially into a cam chamber 16, the end of the rod within this chamber having a grooved element 17 secured thereto. The groove in this element receives eccentric pins 18 projecting from the ends of the propeller blades 11. Movement of the piston in the cylinder effects the rotary or pitch adjustment of the blades 11. Spring means 20 in one end of the cylinder 13 between the piston 14 and the end wall of the cylinder tend to move the piston in one direction, at the end of which movement the propeller blades will be in a maximum-pitch or feathered position. (See FIG. 3).

To effect movement of the blades in the opposite direction toward a minimum-pitch or even reversed-pitch position, means are provided to supply the cylinder 13 with hydraulic fluid under pressure. This fluid is drawn from a reservoir (not shown) by power-driven pump means 21. The fluid flows to a valve chamber 22 through an inlet port 23 and is directed through a passage 24, valves 25 and 26, and a tube 27 commonly referred to as a "beta tube," to the piston cylinder. Valve chamber 22 receives a spool valve 28 forming a part of the governing mechanism, the spool being connected by rod 30 with a flyweight mechanism 31 for operation thereby. The flyweight mechanism has a rotor 32 arranged to be driven through motion-transmitting means 33' by a prime mover 34, which may be an engine of suitable type such as a gas turbine engine arranged to drive the propeller through a suitable transmission represented by gearing 34A. When the rotor revolves, flyweights 33 pivoted thereto tend to swing outwardly under centrifugal force and cause arms 34' projecting therefrom to move an abutment member 35 in opposition to the force of a speeder spring 36. The abutment member 35 is connected with the valve stem 30 so that movement of the abutment member imparts movement to the valve 28. The speeder spring 36 also abuts an element 37 supported for adjustment on a pivoted yoke 38, the yoke 38 being moved by suitable means, such as a bellcrank 40, to position the element 37 in the operation of setting the speeder spring.

During operation at a selected setting of the speeder spring, valve spool 28 will be in position to prevent the flow of hydraulic fluid to the propeller pitch adjusting means. Spring 36 normally tends to move the valve 28 to a position to establish communication between the inlet 23 and passage 24 to direct fluid under pressure to the pitch adjusting mechanism. This fluid flows through the line 24, valves 25 and 26, and beta tube 27 to the space between the end wall of the piston chamber and the piston. This fluid under pressure moves the piston, causing movement to be imparted to the eccentric pins 18 and rotary adjustment of the propeller blades.

The beta tube 27 is movable in a chamber 41 formed in a body 42, such body being supported for longitudinal adjustment in a manifold 43. Suitable means, such as a cam 44, is supported for movement adjacent the body 42. A follower pin 45 carried by the body engages the cam in such a manner that when the latter is moved, motion will be imparted to the body in a manual pitch adjusting operation. Suitable motion-transmitting means 46 extends from the cam to the pilot compartment to permit such manual adjustment.

The valve 26 constitutes a follow-on type of valve. The beta tube 27 is provided with a port 27A which cooperates with a wall of the body 42 to govern fluid flow under pilot command to the pitch adjusting mechanism. It will be apparent that since the beta tube is secured to the piston, it will move with the piston, causing port 27A to move relative to a wall of body 42. If the piston is moving in one direction, the port 27A may be blocked by the wall which will interrupt flow and further pitch change. The location of the body 42 may thus serve to limit the adjustment of the propeller blades toward minimum or reversed pitch.

Figure 3:
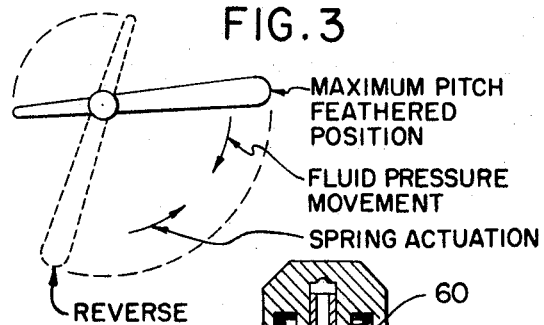
FIG. 3 is a schematic end view of a propeller blade showing the same in full lines at one limit of its pitch adjustment and in dotted lines at the other limit.
Figure 2:
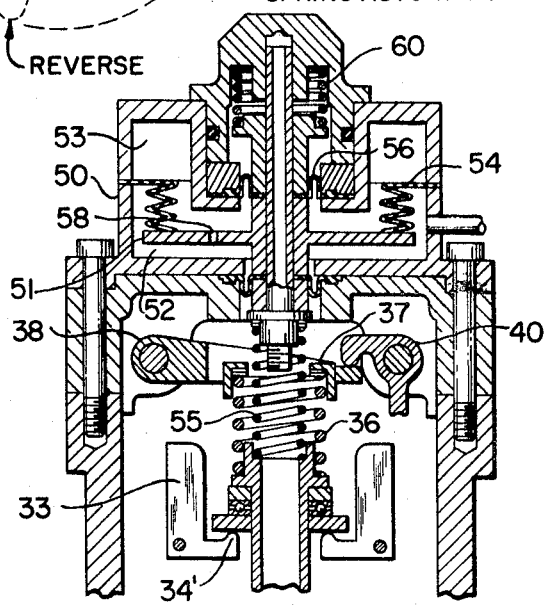
FIG. 2 is an axial sectional view taken through the end portion of a governor provided with the compensating mechanism.

Valve 25 is provided for manual operation by the pilot to permit emergency feathering of the propeller. This valve, when moved in a predetermined manner, establishes communication between the piston cylinder and a reservoir. When such communication is established, spring 20 will move the piston to cause the propeller blades to move the feathered position. The extremes of adjustment of one of the blades and the directions of movement in response to fluid pressure and spring force are shown in FIG. 3.

It will be apparent from FIG. 1 of the drawing that when the rate of operation of engine 34 increases, an increase in speed of rotation will be imparted to the rotor 32, causing the flyweights 33 to tend to swing outwardly in response to centrifugal force. This motion causes valve spool 28 to be moved in a direction to establish communication between passage 24 and an exhaust or outlet port 47, permitting fluid to bleed from the piston cylinder 13. This release of fluid permits spring 20 to move piston 14 to change the pitch of the propeller blades 11. As previously pointed out, this change will be in a direction toward maximum pitch or feathered position. Such setting of the propeller blades increases the load on the engine, causing a reduction in speed of operation. As mentioned above, this type of control is known as the propeller governing mode.

The invention herein comprises the application of a fluid pressure responsive mechanism to anticipate the operation of the governing mechanism. As shown in FIG. 1, this fluid pressure responsive mechanism is disposed adjacent to, and cooperates with, the propeller governor. It comprises a housing means 50 forming a chamber which is divided by a wall 51 into chamber sections 52 and 53. The wall 51 is, in the present instance, supported for movement by a bellows mechanism 54, which is clamped at its periphery between sections of the housing 50. The wall has a motion-transmitting connection through a spring 55 with the abutment member 35 so that forces of motion on the part of wall 51 may be transmitted through the abutment member to the valve 28. Suitable seals 56 are arranged between projections on the wall 51 and the housing to prevent the escape of fluid pressure.

Fluid under pressure is supplied to the chamber section 52 through a line 57 leading from the output side of the compressor of the gas turbine engine 34. The wall 51 is provided with a restricted port 58 to establish limited communication between the chamber sections 52 and 53 so that fluid pressures at opposite sides of the wall may equalize. A coil spring 60, disposed between the upper end of one of the projections on the wall 51 and the casing 50, tends to move the wall in a downward direction. This spring also tends to oppose the force of the spring 55 to place the wall 51 in a state of equilibrium or balanced position when the pressures in the chamber sections 52 and 53 are equal. The wall has equal areas exposed to the chamber sections. When such pressures or forces on opposite sides of the wall are equalized, the spool valve 28 will be in position to prevent the flow of hydraulic fluid to the pitch adjusting mechanism and the propeller blades will be held at a selected pitch.

In the operation of the engine 34, an increase in speed will cause an increase in compressor output pressure. This increase is transmitted to the chamber section 52 and will impose on the wall 51 a differential force, which will cause the wall to move in an upward direction, decreasing the load on abutment 35 imposed by the initial force of spring 55. As a result, abutment 35 will tend to move in an upward direction, decreasing the force opposing outward swinging movement of the flyweights 33. Motion will also be transmitted to the spool valve 28, causing it to tend to establish communication between the piston cylinder and exhaust. The action of the governor will thus be anticipated. It should be obvious that the mechanical transfer of force from the engine to the flyweight governor would require a predetermined time. The compensator effects the anticipating operation in a shorter period of time. Through the provision of the compensating mechanism, the tendency of the engine to cycle is thus reduced. The orifice 58 provided in the wall 51 permits the equalization of pressure on opposite sides of the wall after a predetermined period of time, and the original setting of the governor is thus restored.

It will be obvious that if the speed of the engine should decrease, the application of fluid pressure to chamber section 52 would also decrease, permitting fluid trapped above the wall to expand and cause the wall to move in a downward direction. This movement increases the load on the flyweights and moves the valve spool 28 downwardly to admit fluid under pressure to the pitch adjusting mechanism to decrease the propeller pitch. The load on the engine will thus be decreased, permitting it to operate at a faster rate.

I claim:

1. In a governor mechanism, the combination comprising:
   an element supported for movement to control the adjustment of a variable load adapted to be driven by a prime mover;
   a first means yieldably urging said element in one direction;
   a second means responsive to an increase in speed of the prime mover to move said element in the opposite direction in opposition to the force of said first means; and
   a third means disposed adjacent said governor mechanism and responsive to changes in a fluid pressure produced by the prime mover to temporarily vary the effective force of said first means, an increase in such fluid pressure serving to decrease the effective force of said first means whereby said element will be moved in said opposite direction in anticipation of movements by said second means.

2. The combination of claim 1 in which the third means has a member movable in response to a fluid pressure differential.

3. The combination of claim 2 in which resilient means is provided for transmitting force from said movable member to said load adjustment controlling element.

4. The combination of claim 2 in which said member is a wall supported for movement.

5. The combination of claim 4 in which said movable wall has oppositely directed surfaces of substantially equal areas.

6. The combination of claim 5 in which the movable wall divides a chamber into sections and means are provided establishing restricted communication between the sections.

7. The combination of claim 1 in which additional means are provided to normally balance said third means.

8. The combination of claim 1 in which the third means has a casing forming a chamber, a diaphragm dividing the chamber into two sections, means for admitting fluid pressure into a first section, and means establishing restricted communication between the sections.

9. The combination of claim 8 provided with resilient means for transmitting motion from the diaphragm to said load adjustment controlling element.

10. The combination of claim 9 in which said first means is a spring and the resilient motion-transmitting means is a second spring arranged substantially parallel to the spring of the first means.

11. The combination of claim 10 in which the force of fluid pressure admitted to the first section of said chamber is applied to the diaphragm to cause it to tend to reduce the effect of the force applied to said element by said first means.

12. The combination of claim 1 in which the load adjustment controlling element is a valve member, the first means is a spring, the second means is a flyweight mechanism, and the third means is an assembly having means forming a chamber, a wall supported in the chamber to divide the same into first and second sections in restricted communication with one another, resilient means transmitting force from said wall to said valve member, and means admitting fluid pressure from a source produced by the prime mover to the first of said chamber sections.